United States Patent
Molander et al.

(10) Patent No.: US 7,080,326 B2
(45) Date of Patent: Jul. 18, 2006

(54) METHOD AND SYSTEM FOR MANAGING MULTI—PANED WINDOWED ENVIRONMENTS

(75) Inventors: Mark E. Molander, Cary, NC (US); John L. Scanlon, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 601 days.

(21) Appl. No.: 10/193,467

(22) Filed: Jul. 11, 2002

(65) Prior Publication Data

US 2004/0008224 A1    Jan. 15, 2004

(51) Int. Cl.
    *G06F 13/00*     (2006.01)
    *G06F 15/00*     (2006.01)

(52) U.S. Cl. .................. 715/788; 715/798

(58) Field of Classification Search ........ 715/837, 715/834, 781, 788, 790, 792, 798, 800; 345/156, 345/157
See application file for complete search history.

(56) References Cited

U.S. PATENT DOCUMENTS

| | | |
|---|---|---|
| 4,611,232 A | 9/1986 | Searby |
| 4,985,849 A | 1/1991 | Hideaki |
| 5,050,225 A | 9/1991 | Itoh |
| 5,189,404 A | 2/1993 | Masimo et al. |
| 5,329,289 A | 7/1994 | Sakamoto et al. |
| 5,396,590 A | 3/1995 | Kreegar |
| 5,428,721 A | 6/1995 | Sato et al. |
| 5,712,995 A | 1/1998 | Cohn |
| 5,737,558 A | 4/1998 | Knight, III et al. |
| 5,771,042 A | 6/1998 | Santos-Gomez |
| 5,801,699 A * | 9/1998 | Hocker et al. .............. 715/837 |
| 5,848,201 A | 12/1998 | Kajiwara |
| 5,874,962 A * | 2/1999 | de Judicibus et al. ...... 715/789 |
| 5,917,483 A | 6/1999 | Duncan et al. |
| 5,949,408 A | 9/1999 | Kang et al. |
| 5,956,043 A | 9/1999 | Jensen |
| 6,115,025 A | 9/2000 | Buxton et al. |
| 6,141,007 A | 10/2000 | Lebling et al. |
| 6,219,028 B1 * | 4/2001 | Simonson ................... 715/862 |
| 6,271,838 B1 | 8/2001 | Gentner et al. |
| 6,326,978 B1 * | 12/2001 | Robbins ..................... 345/654 |
| 6,509,915 B1 * | 1/2003 | Berman et al. ............. 715/840 |

* cited by examiner

*Primary Examiner*—Cao (Kevin) Nguyen
(74) *Attorney, Agent, or Firm*—Cardinal Law Group; Randall J. Bluestone

(57) ABSTRACT

A method is directed to managing data and navigation panes in a windowed environment. The method provides for displaying a plurality of panes within the single window, receiving a user input, displaying at least one pivot point input location in response to the user input, receiving a twist input, and modifiying the plurality of panes in response to the twist input.

23 Claims, 7 Drawing Sheets

METHOD AND SYSTEM FOR MANAGING MULTI—PANED WINDOWED ENVIRONMENTS

FIELD OF THE INVENTION

In general, the invention relates to managing data in a graphical user interface (GUI). More specifically, the invention relates to a method and system for managing multiple panes within a windowed environment.

BACKGROUND OF THE INVENTION

Graphical user interfaces (GUI's) have made it possible to access and display voluminous amounts of information and data. One type of GUI utilizes a windowed format for displaying information and data with each geographic area referred to as a "window". Such information and data may include files and their contents, directories, and the like. Information and data are frequently displayed within one or more "panes" within the window and allow a user to access several groups of information/data with a great amount of organization.

Unfortunately, the volume of data available can often preclude its usefulness. Therefore, windowed formats have also offered the user the ability to manipulate the size and shape of the panes within the window, commonly referred to as "direct manipulation repositioning capability". This form of management often involves the tedious task of manipulating the user interface over a specific portion of a data pane border and maneuvering a "split bar" divider of the data pane border to a desired location and then "dropping" it to attain a desired position.

While the result may be desirable, the process often has an additional result of the loss of productivity due to the time spent manipulating the data panes. It would be desirable, therefore to provide a method and system that would overcome these and other disadvantages.

SUMMARY OF THE INVENTION

The present invention is directed to a system and method for managing multiple panes within a windowed environment. The invention allows a graphical user interface (GUI), displaying a plurality of panes within the single window, to receive a user input, display at least one pivot point input location in response to the user input, receive a "twist" input command, and modify the plurality of panes in response to the "twist" input command.

One aspect of the invention provides a method for managing data panes within a windowed environment by displaying a plurality of panes within the single window, receiving a user input, displaying at least one pivot point input location in response to the user input, receiving a "twist" input, and modifying the plurality of panes in response to the "twist" input.

In accordance with an aspect of the invention, a system for managing multiple display panes within a single display window of a graphical user interface is provided. The system includes means for displaying a plurality of panes within the single window. The system further includes means for receiving a user input. Means for displaying at least one pivot point input location in response to the user input is provided. Means for receiving a "twist" input, and means for modifying the plurality of panes in response to the "twist" input are also provided.

In accordance with another aspect of the invention, a computer readable medium storing a computer program includes: computer readable code for displaying a plurality of panes within the single window, computer readable code for receiving a user input, computer readable code for displaying at least one pivot point input locations in response to the first user input, computer readable code for receiving a "twist" input, and computer readable code for modifying the plurality of panes in response to the "twist" input.

The foregoing and other features and advantages of the invention will become further apparent from the following detailed description of the presently preferred embodiment, read in conjunction with the accompanying drawings. The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENT

In general, the invention relates to managing data in a graphical user interface (GUI) and more particularly to managing multiple panes within a windowed environment. The present invention allows a graphical user interface (GUI), displaying a plurality of panes within the single window, to receive a user input, display at least one pivot point input location in response to the user input, receive a "twist" input command, and modify the plurality of panes in response to the "twist" input command.

Figure 1:
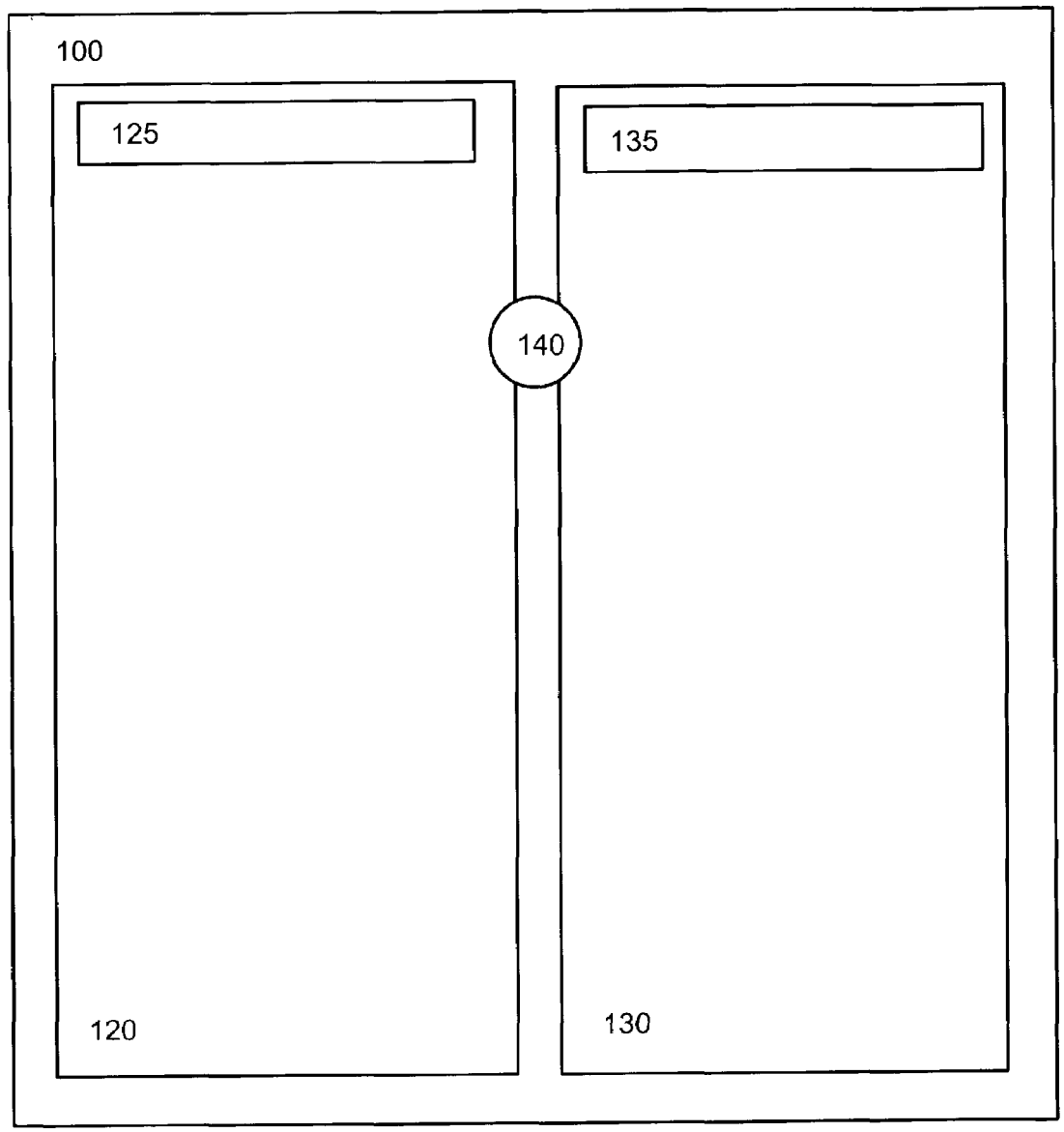
FIG. 1 is a block diagram illustrating an embodiment of the present invention.

FIG. 1 is a block diagram illustrating an embodiment of the present invention. FIG. 1 details an embodiment of a system for managing data in a graphical user interface (GUI), in accordance with the present invention, and may be referred to as a windowed environment as is known in the art.

The windowed environment includes a window 100, a left vertical data pane 120, a right vertical data pane 130, and pivot point 140. Each vertical data pane 120 and 130 further includes a vertical data pane title bar 125 and 135, respectively.

Window 100 is generated within the graphical user interface (GUI), such as an operating system, application program, and the like. In one embodiment, window 100 includes the aforementioned elements as presented in FIG. 1 and as known in the art. In another embodiment, window 100 includes additional vertical data panes, each including an additional vertical data pane title bar, the user determining the number of vertical data panes utilizing criteria such as available space, usefulness, and the like. In yet another embodiment, window 100 includes additional panes, horizontal or vertical, each including an associated pane title bar and discussed in FIGS. 3 and 4 below.

Each of the vertical data panes 120 and 130 are a software component, as known in the art, and include data and information as provided by the underlying GUI. In one embodiment, the standard letter format provides an advantageous presentation of the data and information for the user. Such GUI's may include an operating system, application programs, and the like.

In another embodiment, vertical data panes 120 and 130 further include tools to manipulate data. Such tools may include slider bars located around the edges of the pane to allow scrolling, "snap" controls allowing a user to quickly minimize or maximize a data pane, and the like. Vertical data pane title bars 125 and 135 provide information about the respective vertical data pane, such as directory information, file information, and the like.

Pivot point 140 is a software component allowing a user to communicate with the GUI regarding management of vertical data panes 120 and 130. Pivot point 140 is located between vertical data panes 120 and 130 and provides a user the ability to reorient the vertical data panes 90 degrees. The ability to rotate data panes 90 degrees is referred to as "twisting" the act of a user implementing "twisting" with regard to data panes is referred to as a data pane "twist" input command. Implementing a "twist" command requires the user to "click", as known in the art, the pivot point 140.

In one embodiment, pivot point 140 appears as a permanent feature whenever two or more vertical data panes are utilized within the GUI. In another embodiment, pivot point 140 appears whenever two or more vertical data panes are utilized and a user input corresponds with the location of pivot point 140. In this embodiment, the appearance of pivot point 140 at a specified instance has the effect of reducing visual noise within the GUI.

In yet another embodiment, the location of pivot point 140 may be adjusted by a user. In this embodiment, the location of pivot point 140 may be adjusted to any location along a border between both vertical data panes. The modification of the location of pivot point 140 results in a related modification of vertical data panes 120 and 130, as well, and is referred to as "dragging" and "dropping". In one example, pivot point 140 can be relocated vertically along the border between vertical data panes 120 and 130. In another embodiment, additional pivot points 140 are provided as a result of an increase in the number of data panes. In an example, the number of pivot points provided is determined as one less than the total number of data panes (n−1) utilized.

Figure 2:
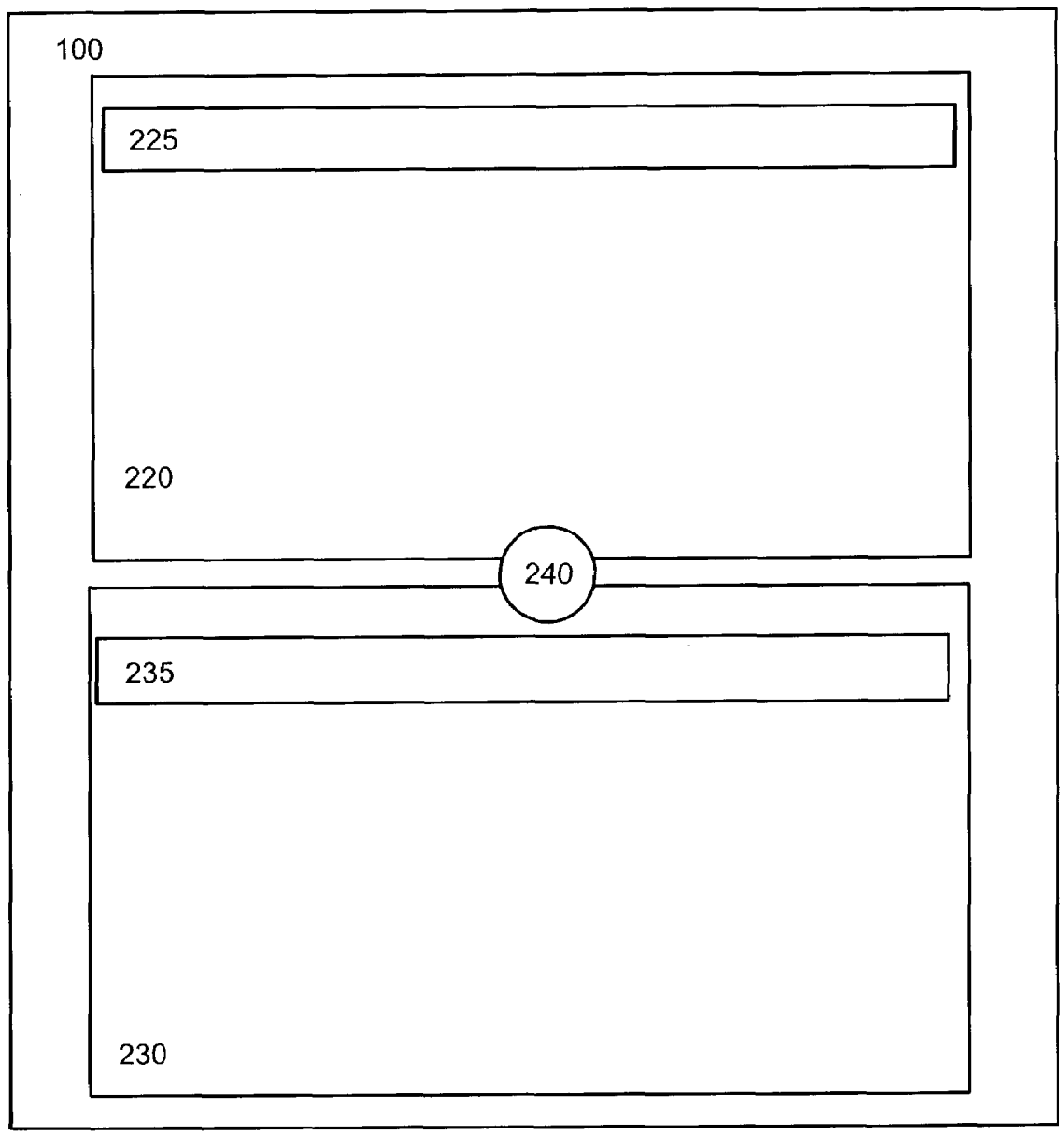
FIG. 2 is a block diagram illustrating another embodiment of the present invention.

FIG. 2 is a block diagram illustrating another embodiment of the present invention. FIG. 2 details another embodiment of a system for managing data in a graphical user interface (GUI), in accordance with the present invention, and may also be referred to as a windowed environment as is known in the art. Like components from FIGS. 1 and 2 are labeled identically.

The windowed environment includes a window 100, an upper horizontal data pane 220, a lower horizontal data pane 230, and pivot point 240. Each horizontal data pane 220 and 230 further includes a horizontal data pane title bar 225 and 235, respectively.

As described in FIG. 1, window 100 is generated within the graphical user interface (GUI), such as an operating system, application program, and the like. In one embodiment, window 100 includes the aforementioned elements as presented in FIG. 2 and as known in the art. In another embodiment, window 100 includes additional vertical data panes, each including an additional vertical data pane title bar, the user determining the number of vertical data panes utilizing criteria such as available space, usefulness, and the like. In yet another embodiment, window 100 includes additional data panes, horizontal or vertical, each including an associated pane title bar and discussed in FIGS. 3 and 4 below.

Each of the horizontal data panes 220 and 230 are a software component, as known in the art, and include data and information as provided by the underlying GUI and presented in a landscaped format. In one embodiment, the landscaped format provides an advantageous presentation of the data and information for the user. Such GUI's may include an operating system, application programs, and the like.

In another embodiment, horizontal data panes 220 and 230 further include tools to manipulate data. Such tools may include slider bars located around the edges of the pane to allow scrolling, "snap" controls allowing a user to quickly minimize or maximize a data pane, and the like. Horizontal data pane title bars 225 and 235 provide information about the respective horizontal data pane, such as directory information, file information, and the like.

Pivot point 240 is a software component allowing a user to communicate with the GUI regarding management of horizontal data panes 220 and 230. Pivot point 240 is located between horizontal data panes 220 and 230 and provides a user the ability to reorient the horizontal data panes.

In one embodiment, pivot point 240 appears as a permanent feature whenever two or more horizontal data panes are utilized within the GUI. In another embodiment, pivot point 240 appears whenever two or more horizontal data panes are utilized and a user input corresponds with the location of pivot point 240. In this embodiment, the appearance of pivot point 240 at a specified instance has the effect of reducing visual noise within the GUI.

In yet another embodiment, the location of pivot point 240 may be adjusted by a user. In this embodiment, the location of pivot point 240 may be adjusted to any location along a border between both horizontal data panes. The modification of the location of pivot point 240 results in a related modification of horizontal data panes 220 and 230, as well. In one example, pivot point 240 can be relocated horizontally along the border between horizontal data panes 220 and 230. In another embodiment, additional pivot points 240 are provided as a result of an increase in the number of data panes. In an example, the number of pivot points provided is determined as one less than the total number of data panes (n−1) utilized.

Figure 3:
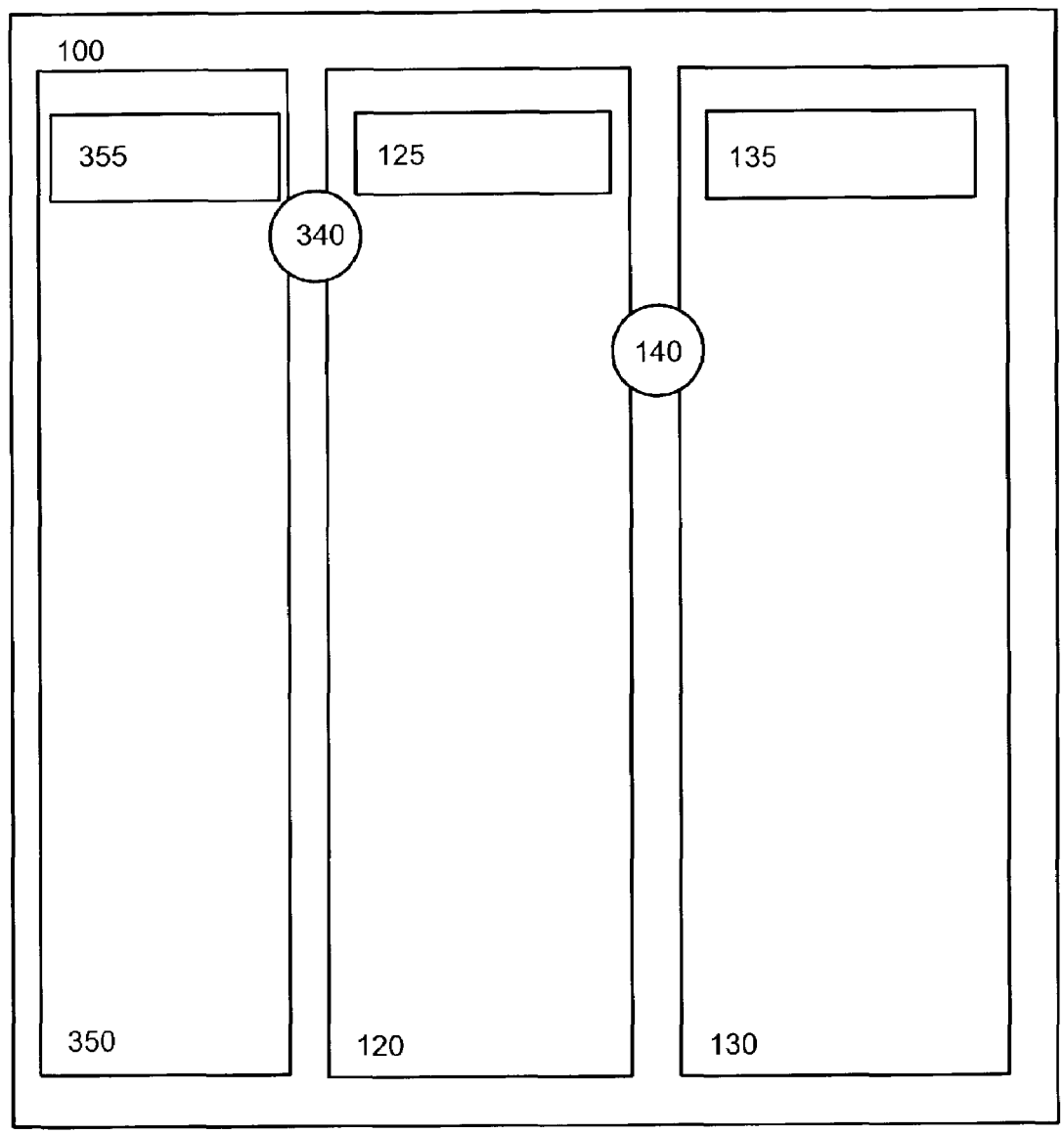
FIG. 3 is a block diagram illustrating yet another embodiment of the present invention.

FIG. 3 is a block diagram illustrating yet another embodiment of the present invention. FIG. 3 details another embodiment of a system for managing data in a graphical user interface (GUI), in accordance with the present invention, and may be referred to as a windowed environment as is known in the art. Like components from FIGS. 1 and 3 are labeled and function identically.

The windowed environment includes a window 100, a left vertical data pane 120, a right vertical data pane 130, pivot points 140 and 340, and a vertical navigation pane 350. Each vertical data pane 120 and 130 further includes a vertical data pane title bar 125 and 135, respectively. Vertical navigation pane 350 further includes a vertical navigation pane title bar 355.

Window 100 is generated within the graphical user interface (GUI), such as an operating system, application program, and the like. In one embodiment, window 100 includes the aforementioned elements as presented in FIG. 3 and as known in the art. In one example, the present invention is implemented as a multi-paned system management application such as IBM Director, Tivoli TME Framework, and the like. In another embodiment, window 100 includes additional vertical data panes, each vertical data pane including an additional vertical pane title bar. In this embodiment, the number of additional vertical data panes is dependent upon criteria such as available space, usefulness, and the like.

Pivot point 340 is a software component, as known in the art, allowing a user to communicate with the GUI regarding management of vertical navigation pane 350. Pivot point 340 is located between vertical navigation pane 350 and left vertical data pane 120. Pivot point 340 provides a user the ability to choose a desired navigation pane type for display.

In one embodiment, pivot point 340 appears as a permanent feature whenever a navigation data pane is utilized within the GUI. In another embodiment, pivot point 340 appears whenever a navigation data pane is utilized and a user input corresponds with the location of pivot point 340. In this embodiment, the appearance of pivot point 340 at a specified instance has the effect of reducing visual noise within the GUI.

In yet another embodiment, the location of pivot point 340 may be adjusted by a user. In this embodiment, the adjustment of the location of pivot point 340 allows the user to position the pivot point to any location along a border between vertical navigation pane 350 and the left vertical data pane 120 as is required. In another embodiment, additional pivot points 140 are provided as a result of an increase in the number of vertical data panes. In an example, the number of pivot points provided is determined as one less than the total number of vertical data panes (n−1) utilized.

Vertical navigation pane 350 is a software component, as known in the art, and includes data and information regarding navigation as provided by the underlying GUI and presented in a standard tree control format. In one embodiment, the standard tree control format provides an advantageous presentation of the data and information for the user. In one example, a vertically-oriented navigation pane includes a 2-dimensional navigation tree control within it that allows manipulation of data within the accompanying data panes. Such GUI's may include an operating system, application programs, and the like. Vertical navigation data pane title bar 355 provides information about the vertical navigation data pane, such as directory information, file information, and the like.

Figure 4:
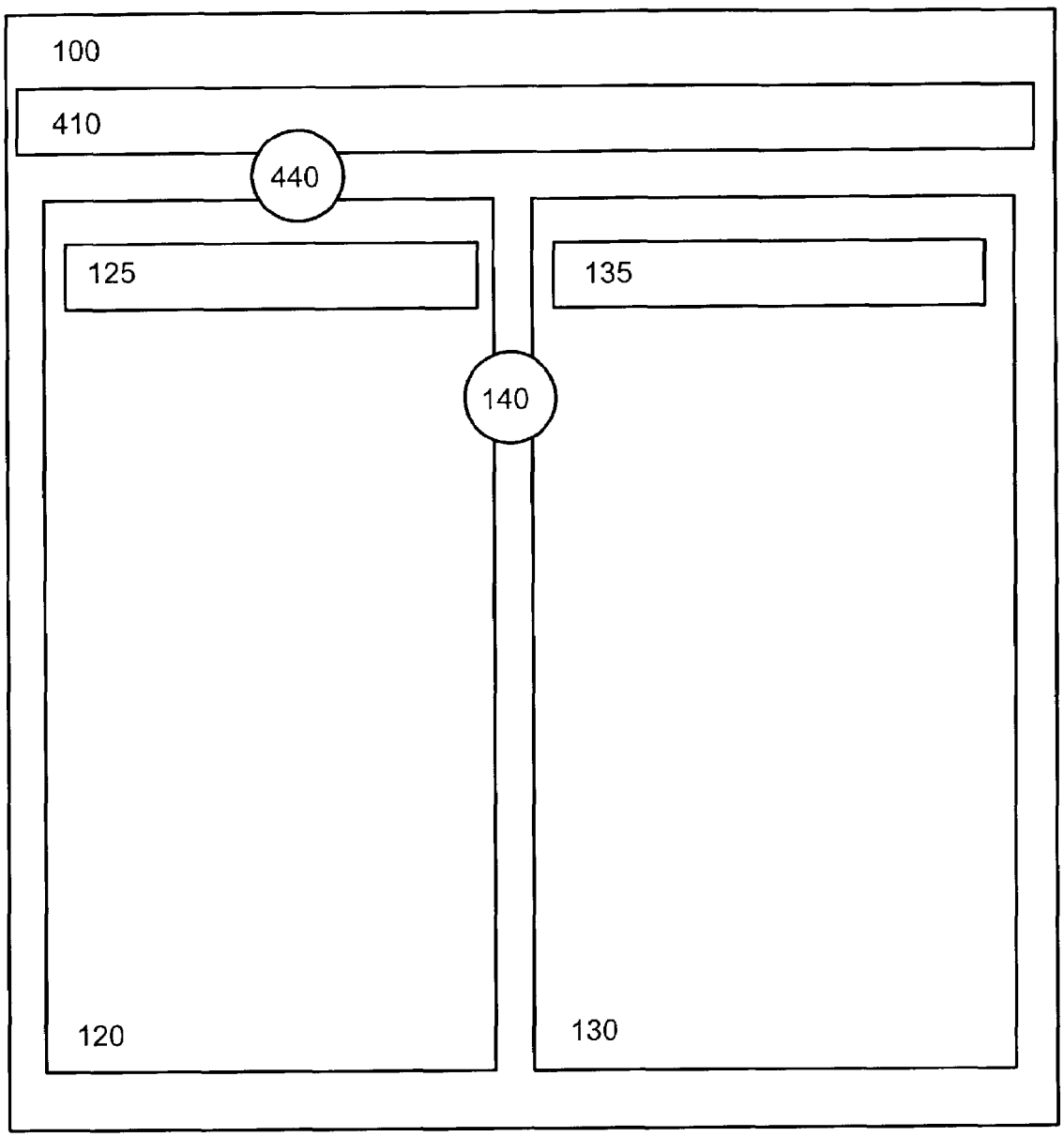
FIG. 4 is a block diagram illustrating another embodiment of the present invention.

FIG. 4 is a block diagram illustrating yet another embodiment of the present invention. FIG. 4 details another embodiment of a system for managing data in a graphical user interface (GUI), in accordance with the present invention, and may be referred to as a windowed environment as is known in the art. Like components from FIGS. 1, 3 and 4 are labeled and function identically.

The windowed environment includes a window 100, a left vertical data pane 120, a right vertical data pane 130, pivot points 140 and 440, and a horizontal navigation pane 410. Each vertical data pane 120 and 130 further includes a vertical data pane title bar 125 and 135, respectively.

Window 100 is generated within the graphical user interface (GUI), such as an operating system, application program, and the like. In one embodiment, window 100 includes the aforementioned elements as presented in FIGS. 1 and 3 and as known in the art. In one example, the present invention is implemented as a multi-paned system management application, as is known in the art. In another embodiment, window 100 includes additional vertical data panes, each vertical data pane including an additional vertical pane title bar. In this embodiment, the number of additional vertical data panes is dependent upon criteria such as available space, usefulness, and the like.

Horizontal navigation pane 410 is a software component, as known in the art, and includes data and information regarding navigation as provided by the underlying GUI and presented in a minimized landscaped format referred to as a "breadcrumb" format. Such GUI's may include an operating system, application programs, and the like. In one embodiment, the breadcrumb format provides an advantageous presentation of the navigational data and information for the user. In one example, a horizontally-oriented navigation pane includes a 1-dimensional navigation tree within it that allows minimal manipulation of data within the accompanying data panes, resulting in an increased amount of area for displaying data panes.

Pivot point 440 is a software component, as known in the art, allowing a user to communicate with the GUI regarding management of horizontal navigation pane 310. Pivot point 440 is located between horizontal navigation pane 310 and left vertical data pane 120. Pivot point 440 provides a user the ability to choose a desired navigation pane type for display.

In one embodiment, pivot point 440 appears as a permanent feature whenever a navigation data pane is utilized within the GUI. In another embodiment, pivot point 440 appears whenever a navigation data pane is utilized and a user input corresponds with the location of pivot point 440. In this embodiment, the appearance of pivot point 440 at a specified instance has the effect of reducing visual noise within the GUI.

In yet another embodiment, the location of pivot point 440 may be adjusted by a user. In this embodiment, the adjustment of the location of pivot point 440 allows the user to position the pivot point to any location along a border between horizontal navigation pane 310 and the left vertical data pane 120 as is required. In another embodiment, additional pivot points 140 are provided as a result of an increase in the number of vertical data panes. In an example, the number of pivot points provided is determined as one less than the total number of vertical data panes (n−1) utilized.

In operation and referring to FIGS. 3 and 4, and detailed in FIG. 7 below, only one type of navigation pane, horizontal navigation pane 410 or vertical navigation pane 350, is implemented at any given time and is user determined. That is, when vertical navigation pane 350 is in use, horizontal navigation pane 410 is not available. Similarly, when horizontal navigation pane 410 is in use, vertical navigation pane 350 is not available. Moving between the vertical navigation pane 350 and the horizontal navigation pane 410 is referred to as "twisting", and is implemented as a navigation pane "twist" input command utilizing pivot points 340 or 440.

In one embodiment, and referring to FIG. 3, a user utilizes the vertical navigation pane 350 to determine data/information provided to vertical data panes 120 and 130 until the user has achieved confidence that the data/information within the vertical data panes 120 and 130 is the desired data/information. In this embodiment, once the user has achieved confidence, the navigation pane "twist" input command is implemented utilizing pivot point 340. Implementation of the "twist" command, and referring to FIG. 4, includes replacing vertical navigation pane 350 with the horizontal navigation pane 410, resulting in a corresponding increase in the area available for vertical data panes 120 and 130.

In another embodiment, and referring to FIG. 4, a user determines that additional navigation is needed after the horizontal navigation pane 410 has been implemented. In this embodiment, the user implements the navigation pane "twist" input command, utilizing pivot point 440, to return to the vertical navigation pane 350 configuration of FIG. 3.

Figure 5:
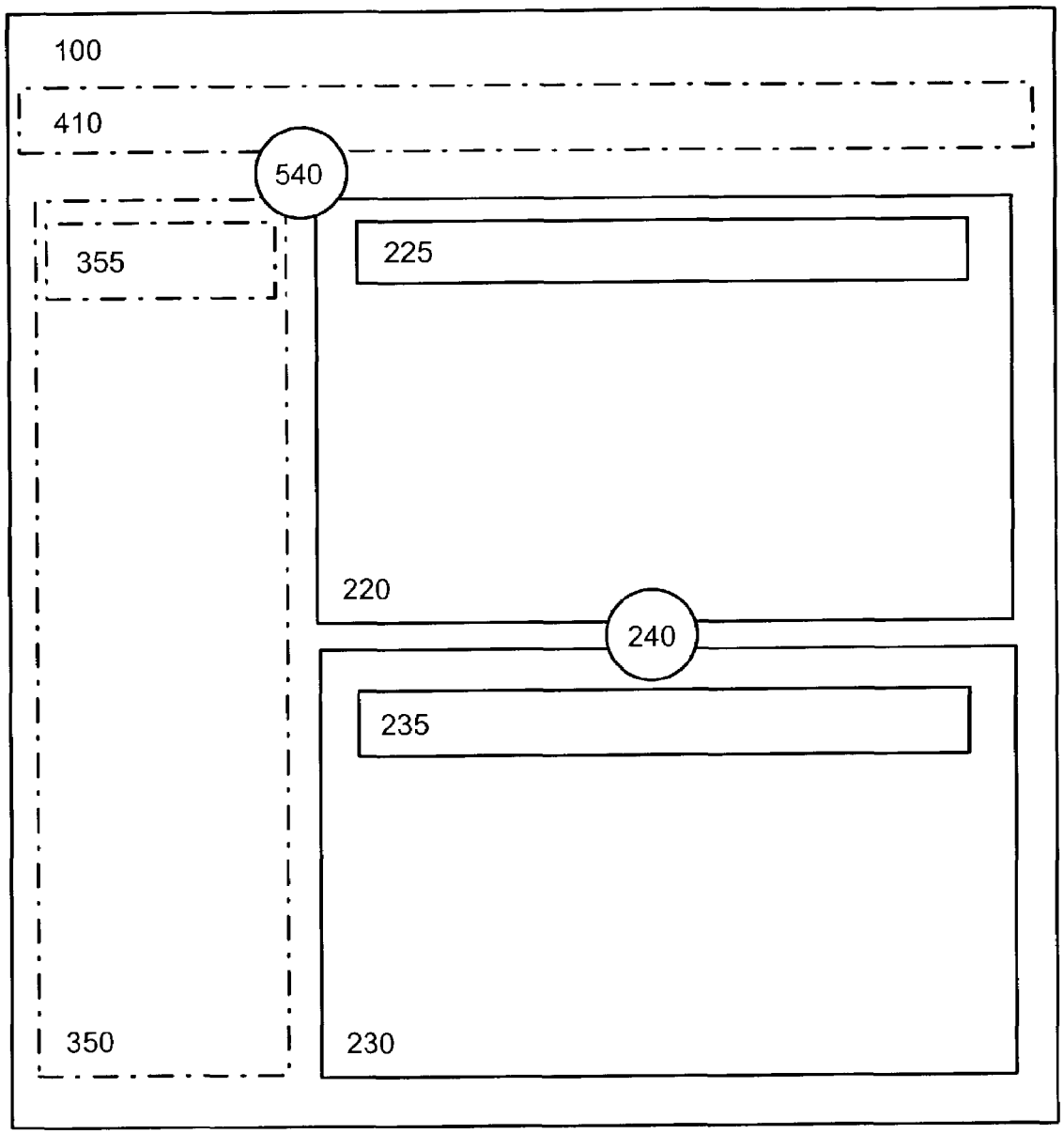
FIG. 5 is a block diagram illustrating yet another embodiment of the present invention.

FIG. 5 is a block diagram illustrating another embodiment of the present invention. FIG. 5 details yet another embodiment of a system for managing data in a graphical user interface (GUI), in accordance with the present invention, and may be referred to as a windowed environment as is known in the art. Like components from FIGS. 1–5 are labeled and function identically.

The windowed environment includes a window 100, an upper horizontal data pane 220, a lower horizontal data pane 230, pivot point 240 and 540, a horizontal navigation pane 410, and a vertical navigation pane 350. Each horizontal data pane 220 and 230 further includes a horizontal data pane title bar 225 and 235, respectively. Vertical navigation pane 350 further includes a vertical navigation pane title bar 355.

Window 100 is generated within the graphical user interface (GUI), such as an operating system, application program, and the like. In one embodiment, window 100 includes the aforementioned elements as presented in FIG. 5 and as known in the art. In one example, the present invention is implemented as a multi-paned system management application such as IBM Director, Tivoli TME Framework, and the like. In another embodiment, window 100 includes additional horizontal data panes, each horizontal data pane including an additional horizontal pane title bar. In this embodiment, the number of additional horizontal data panes is dependent upon criteria such as available space, usefulness, and the like.

Pivot point 540 is a software component, allowing a user to communicate with the GUI regarding management of horizontal and vertical navigation panes 410 and 350. Pivot point 540 is located between horizontal and vertical navigation panes 410 and 350 and upper horizontal data pane 220. Pivot point 540 provides a user the ability to choose a desired navigation pane for display.

In one embodiment, pivot point 540 appears as a permanent feature whenever a navigation data pane is utilized within the GUI. In another embodiment, pivot point 540 appears whenever a navigation data pane is utilized and a user input corresponds with the location of pivot point 540. In this embodiment, the appearance of pivot point 540 at a specified instance has the effect of reducing visual noise within the GUI.

In yet another embodiment, the location of pivot point 540 may be adjusted by a user. In this embodiment, the adjustment of the location of pivot point 540 allows the user to adjust the position of the pivot point to any location along a border between either navigation data pane and the upper horizontal data pane 220, as is required. In another embodiment, additional pivot points 240 are provided as a result of an increase in the number of horizontal data panes. In an example, the number of pivot points provided is determined as one less than the total number of horizontal data panes (n–1) utilized.

In operation and described in FIG. 6 below, only one type of navigation pane, horizontal navigation pane 410 or vertical navigation pane 350, is implemented at any given time and is user determined. That is, when vertical navigation pane 350 is in use, horizontal navigation pane 410 is not available. Similarly, when horizontal navigation pane 410 is in use, vertical navigation pane 350 is not available. Moving between the vertical navigation pane 350 and the horizontal navigation pane 410 is referred to as "twisting", and is implemented as a navigation pane "twist" input command utilizing pivot point 540.

In one embodiment, a user utilizes the vertical navigation pane 350, prior to implementation of the navigation pane "twist" input command, to determine data/information provided to horizontal data panes 220 and 230 until the user has achieved confidence that the data/information within the horizontal data panes 220 and 230 is the desired data/information. In this embodiment, once the user has achieved confidence, the navigation pane "twist" input command is implemented utilizing pivot point 540.

In another embodiment, a user determines that additional navigation is needed after the horizontal navigation pane 410 has been implemented. In this embodiment, the user implements the navigation pane "twist" input command to return to the vertical navigation pane 350 configuration.

Figure 6:
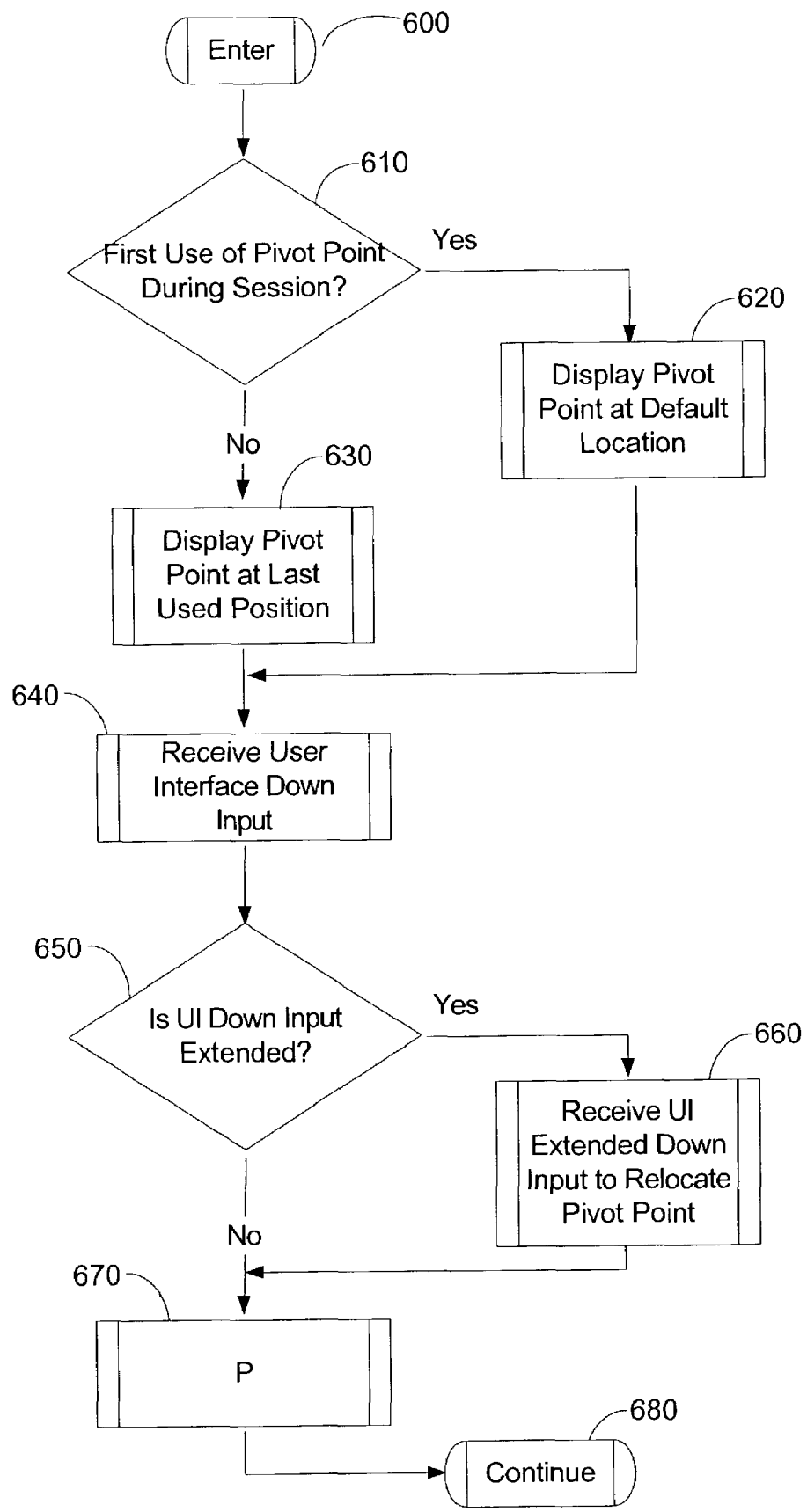
FIG. 6 is a block diagram depicting an exemplary embodiment of code on a computer readable medium in accordance with the present invention.

FIG. 6 is a block diagram depicting an exemplary embodiment of code on a computer readable medium in accordance with the present invention. FIG. 6 details an embodiment of a method for managing data within a graphical user interface (GUI), in accordance with the present invention, and may be referred to as a windowed environment as is known in the art. The method may utilize one or more systems detailed in FIGS. 1 and 2 above.

The method begins at block 600 where a user may determine a need to manage data panes within the GUI. In one embodiment, the method is implemented as a window 100 within the graphical user interface (GUI), such as an operating system, application program, and the like. The method then advances to decision block 610.

At decision block 610, the method determines if a pivot point is being used for the first time during the session. If this is the first use of the pivot point during the session, the method advances to block 620. If this is not the first use of the pivot point during the session, the method advances to block 630.

At block 620, the method displays the pivot point at a default location. In one embodiment, the pivot point default location is illustrated as pivot point 140 and described in FIG. 1. In another embodiment, the pivot point default location is illustrated as pivot point 240 and described in FIG. 2. The method then advances to block 540. At block 630, the method displays the pivot point at its last used position during the session. The method then advances to block 640.

At block 640, the method receives a user interface down input. In one embodiment, the interface is implemented as a point and click user interface. In one example, the point and click user interface is implemented as a "mouse", as is known in the art. In this example, the user interface down input is implemented as a "mouse down" command, as is known in the art. The method then advances to decision block 650.

At decision block 650, the method determines if the user interface down input is an extended input. In one embodiment, the extended input is received from a point and click user interface as an extended down command. In one example, the extended input is received from a "mouse" as an extended "mouse down" command. If the user interface down input is extended, the method advances to block 660. If the user interface down input is not extended, the method advances to block 670.

At block 660, the method receives user interface (UI) input to relocate the pivot point. In one embodiment, the UI input to relocate the pivot point is received in the form of a "drag" and "drop" command, when utilizing a point and click interface. In an example, the pivot point is relocated as described in FIGS. 1 and 2 above. The method then advances to block 670.

At block 670, the method executes a data pane "twist" input command. In one embodiment, the data pane "twist" input command is executed when the method receives UI input to execute the data pane "twist" input command. In one example, the UI input for the data pane "twist" input command is received from a "mouse" as a "mouse up" command.

In another embodiment and referring to FIGS. 1 and 2, FIG. 1 represents a starting point for the data management system including vertical data panes 120 and 130, and FIG. 2 represents horizontal data panes 220 and 230 within the data management system after implementing the data pane "twist" input command associated with pivot points 140 and 240. In an example, after implementing the data pane "twist" input command data/information contained within the left vertical data pane 120 would be displayed within the lower horizontal data pane 230 and data/information contained within the right vertical data pane 130 would be displayed within the upper horizontal data pane 220. In another example, after implementing the data pane "twist" input command data/information contained within the left vertical data pane 120 would be displayed within the upper horizontal data pane 220 and data/information contained within the right vertical data pane 130 would be displayed within the lower horizontal data pane 230.

In yet another embodiment, FIG. 2 represents the starting point for the data management system and FIG. 1 represents the data panes within the data management system after implementing the data pane "twist" input command. The method then advances to block 680 where it returns to standard programming.

Figure 7:
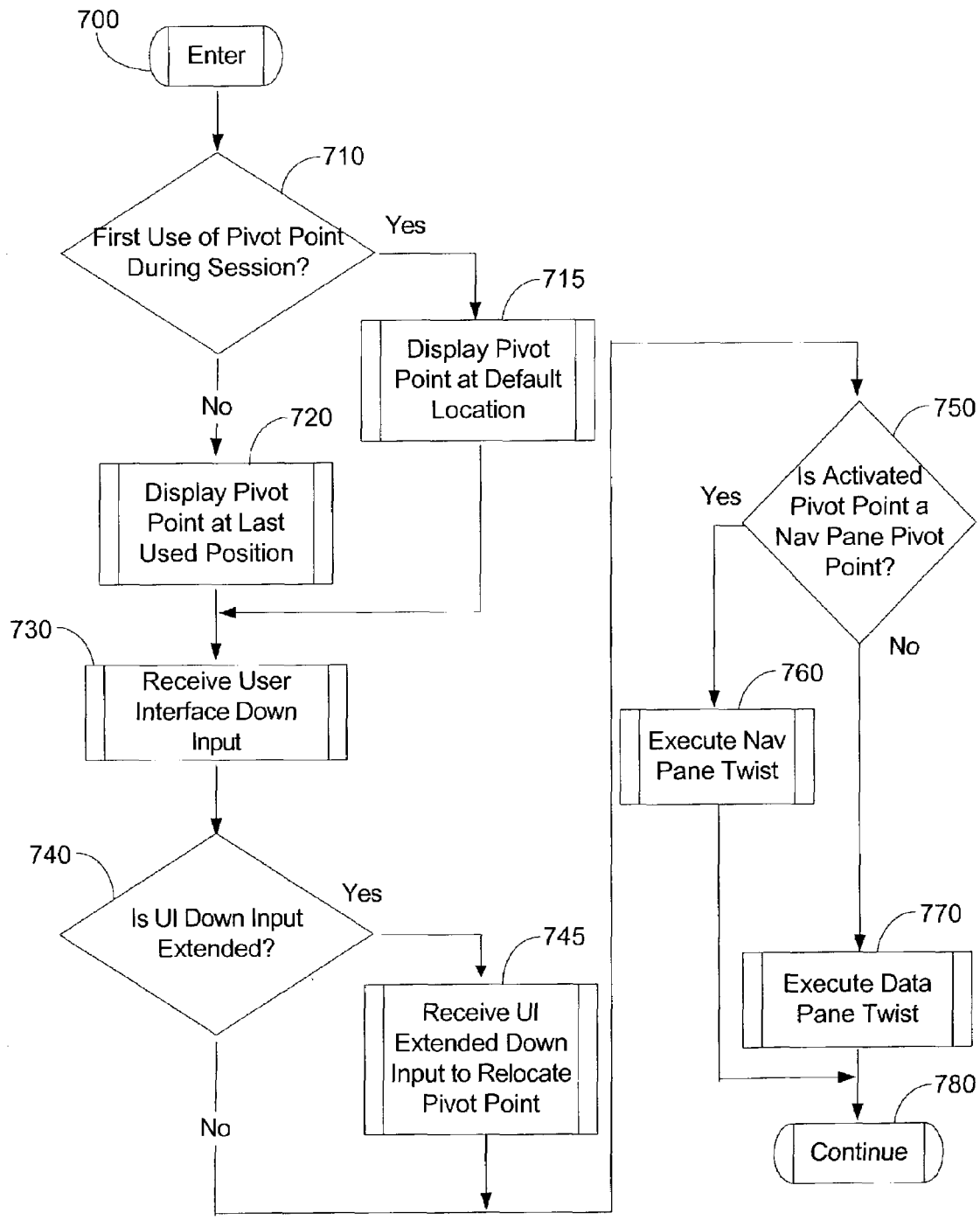
FIG. 7 is a block diagram depicting another exemplary embodiment of code on a computer readable medium in accordance with the present invention.

FIG. 7 is a block diagram depicting an exemplary embodiment of code on a computer readable medium in accordance with the present invention. FIG. 7 details an embodiment of a method for managing data within a graphical user interface (GUI), in accordance with the present invention, and may be referred to as a windowed environment as is known in the art. The method may utilize one or more systems detailed in FIGS. 3–5 above.

The method begins at block 700 where a user may determine a need to manage data panes within the GUI. In one embodiment, the method is implemented as a window 100 within the graphical user interface (GUI), such as an operating system, application program, and the like. In one example, the present invention is implemented as a multi-paned system management application, as is known in the art. The method then advances to decision block 710.

At decision block 710, the method determines if a pivot point is being used for the first time during the session. If this is the first use of the pivot point during the session, the method advances to block 715. If this is not the first use of the pivot point during the session, the method advances to block 720.

At block 715, the method displays the pivot point at a default location. In one embodiment, the pivot point default location is illustrated as pivot point 340 and described in FIG. 3. In another embodiment, the pivot point default location is illustrated as pivot point 440 and described in FIG. 4. The method then advances to block 730. At block 720, the method displays the pivot point at its last used position during the session. The method then advances to block 730.

At block 730, the method receives a user interface down input. In one embodiment, the interface is implemented as a point and click user interface. In one example, the point and click user interface is implemented as a "mouse", as is known in the art. In this example, the user interface down input is implemented as a "mouse down" command, as is known in the art. The method then advances to decision block 740.

At decision block 740, the method determines if the user interface down input is an extended input. In one embodiment, the extended input is received from a point and click user interface as an extended down command. In an example, the extended input is received from a "mouse" as an extended "mouse down" command. If the user interface down input is extended, the method advances to block 745. If the user interface down input is not extended, the method advances to decision block 750.

At block 745, the method receives user interface (UI) input to relocate the pivot point. In one embodiment, the UI input to relocate the pivot point is received in the form of a "drag" and "drop" command, when utilizing a point and click interface. In an example, a data pane pivot point is relocated as described in block 660 of FIG. 6 above and detailed in FIGS. 1 and 2 above. In another example, a navigation pane pivot point is relocated as detailed in FIGS. 3 and 4 above. The method then advances to decision block 750.

At decision block 750, the method determines if the user interface is interacting with a navigation pane pivot point. In one embodiment, the UI is interacting with a pivot point when a down input or "extended" down input is implemented. If the UI is interacting with the navigation pivot point, the method advances to block 760. If the UI is not interacting with the navigation pivot point, the method advances to block 770.

At block 760, the method executes a navigation pane "twist". In one embodiment, and referring to FIGS. 3 and 4 above, a user implements a navigation pane "twist" input command utilizing pivot point 340 of FIG. 3, and replaces the vertical navigation pane 350 with the horizontal navigation pane 410. Replacing the vertical navigation pane 350 with horizontal navigation pane 410 results in a corresponding increase in content area available to vertical data panes 120 and 130 and allows the vertical data panes to expand within the newly available content area.

In another embodiment, a user implements a navigation pane "twist" input command utilizing pivot point 540 of FIG. 5, and replaces the vertical navigation pane 350 with the horizontal navigation pane 410. Replacing the vertical navigation pane 350 with horizontal navigation pane 410 results in a corresponding increase in content area available to horizontal data panes 220 and 230 and allows the horizontal data panes to expand within the newly available content area.

In yet another embodiment, and referring to FIGS. 3 and 4, the user implements the navigation pane "twist" input command utilizing pivot point 440 to replace the horizontal navigation pane 410 with the vertical navigation pane 350. Replacing horizontal navigation pane 410 with vertical navigation pane 350 results in a corresponding decrease in content area available to vertical data panes 120 and 130 and requires the vertical data panes to contract within the newly available content area.

In another embodiment, and referring to FIG. 5, the user implements the navigation pane "twist" input command utilizing pivot point 540 to replace the horizontal navigation pane 410 with the vertical navigation pane 350. Replacing horizontal navigation pane 410 with vertical navigation pane 350 results in a corresponding decrease in content area available to horizontal data panes 220 and 230 and requires the horizontal data panes to contract within the newly available content area. The method then advances to block 780.

At block 770, the method implements a data pane "twist". In one embodiment and referring to FIGS. 3 and 4, the data pane "twist" is implemented as described in block 570 of FIG. 5. The method then advances to block 780 where it returns to standard programming.

The above-described methods and implementation for managing data in a graphical user interface (GUI) are example methods and implementations. These methods and implementations illustrate one possible approach for managing data in a graphical user interface (GUI). The actual implementation may vary from the method discussed. Moreover, various other improvements and modifications to this invention may occur to those skilled in the art, and those improvements and modifications will fall within the scope of this invention as set forth in the claims below.

The present invention may be embodied in other specific forms without departing from its spirit or essential characteristics. The described embodiments are to be considered in all respects only as illustrative and not restrictive.

We claim:

1. A method for managing multiple display panes within a single display window of a graphical user interface, the method comprising:
    displaying a plurality of panes within the single window;
    receiving a user input;
    displaying at least one pivot point input location in response to the user input;
    receiving a twist input; and
    modifying the plurality of panes in response to the twist input, wherein modifying the plurality of panes comprises rotating each pane of the plurality of panes 90 degrees about the pivot point, and resizing each rotated pane.

2. The method of claim 1 wherein receiving the user input comprises:
    monitoring a display screen for cursor movement; and
    comparing the cursor movement to predetermined locations.

3. The method of claim 2 wherein the at least one pivot point location is displayed when the cursor location aligns with the predetermined location.

4. The method of claim 1 wherein the user input comprises a signal received from a point and click user interface.

5. The method of claim 1 wherein receiving the twist input comprises:
    identifying one of the at least one pivot point locations to implement; and
    receiving a user input to implement one of the at least one pivot point locations.

6. The method of claim 5 wherein receiving the user input to implement one of the at least one pivot point locations further comprises:
    receiving a user input to adjust one of the at least one pivot point location;
    displaying the at least one adjusted pivot point location in response to the user input;
    receiving a user input to implement the at least one adjusted pivot point location.

7. The method of claim 1 wherein resizing each rotated pane comprises:
    determining a type for each rotated pane; and
    positioning each rotated pane based on the determined type.

8. The method of claim 7 wherein the type is one of a horizontal navigation pane or vertical navigation pane.

9. The method of claim 1 wherein receiving a twist input comprises receiving an instruction to rotate vertical data panes 90 degrees.

10. A system to manage multiple display panes within a single display window of a graphical user interface, comprising:
    a processor;
    a memory coupled to the processor, the memory comprising a computer usable medium tangibly embodying at least one program of instructions executable by the computer to perform operations comprising:
    displaying a plurality of panes within the single window;
    receiving a user input;
    displaying at least one pivot point input location in response to the first user input;
    receiving a twist input; and
    modifying the plurality of panes in response to the twist input, wherein modifying the plurality of panes comprises rowing each pane of the plurality of panes 90 degrees about the pivot point, and resizing each rotated pane.

11. The system of claim 10 wherein the receiving the user input further comprises:
    monitoring a display screen for cursor movement; and
    comparing the cursor movement to predetermined locations.

12. The system of claim 10 wherein the receiving the twist input further comprises:
    identifying one of the at least one pivot point locutions to implement; and
    receiving a user input to implement one of the at least one pivot point locations.

13. The system of claim 12 wherein the receiving the user input to implement one of the at least one pivot point location further comprises:
    receiving a user input to adjust one of the at least one pivot point location;
    displaying the at least one adjusted pivot point location in response to the user input;
    receiving a user input to implement the at least one adjusted pivot point location.

14. The system of claim 10 wherein resizing each rotated pane further comprises:
    determining a type for each rotated pane; and
    positioning each rotated pane based on the determined type.

15. The system of claim 10 wherein receiving a twist input comprises receiving an instruction to rotate vertical data panes 90 degrees.

16. A computer readable medium storing a computer program comprising:
    computer readable code for displaying a plurality of panes within the single window;
    computer readable code for receiving a user input;
    computer readable code for displaying at least one pivot point input locations in response to the first user input;

computer readable code for receiving a twist input; and computer readable code for modifying the plurality of panes in response to the twist input, wherein computer readable code for modifying the plurality of panes comprises computer readable code for rotating each pane of the plurality of panes 90 degrees about the pivot point, and computer readable code for resizing each rotated pane.

17. The computer readable medium of claim 16 wherein receiving the user input comprises:

computer readable code for monitoring a display screen for cursor movement; and computer readable code for comparing the cursor movement to predetermined locations.

18. The computer readable medium of claim 17 wherein the am least one pivot point location is displayed when the cursor location aligns with the predetermined location.

19. The computer readable medium of claim 16 wherein the user input comprises a signal received from a point and click user interface.

20. The computer readable medium of claim 16 wherein receiving the twist input comprises:

computer readable code for identifying one of the pivot point locations to implement; and computer readable code for receiving a user input to implement one of the at least one pivot point locations.

21. The computer readable medium of claim 20 wherein receiving the user input to implement one of the at least one pivot point location further comprises:

computer readable code for receiving a user input to adjust one of the at least one pivot point location;

computer readable code for displaying the at least one adjusted pivot point location in response to the user input; and computer readable code for receiving a user input to implement the at least one adjusted pivot point location.

22. The computer readable medium of claim 16 wherein resizing each rotated pane comprises:

computer readable code for determining a type for each rotated pane; and computer readable code for positioning each rotated pane based on the determined type.

23. The computer readable medium of claim 16 wherein computer readable code for receiving a twist input comprises computer readable code for receiving an instruction to rotate vertical data panes 90 degrees.

* * * * *